United States Patent
Bilancia et al.

(10) Patent No.: US 9,200,581 B2
(45) Date of Patent: Dec. 1, 2015

(54) METHOD FOR PERFORMING ON/OFF DIAGNOSIS OF A SMART COOLING PUMP FOR AN INTERNAL COMBUSTION ENGINE

(75) Inventors: Michele Bilancia, Turin (IT); Morena Bruno, Chivasso (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 868 days.

(21) Appl. No.: 13/473,742

(22) Filed: May 17, 2012

(65) Prior Publication Data
US 2012/0296548 A1 Nov. 22, 2012

(30) Foreign Application Priority Data
May 19, 2011 (GB) .................... 1108388.8

(51) Int. Cl.
*F01P 5/14* (2006.01)
*F02D 41/22* (2006.01)

(52) U.S. Cl.
CPC . *F02D 41/22* (2013.01); *F01P 5/14* (2013.01); *F01P 2025/30* (2013.01); *F01P 2025/31* (2013.01); *F01P 2025/46* (2013.01); *F01P 2025/64* (2013.01); *Y02T 10/40* (2013.01)

(58) Field of Classification Search
CPC ............... F01P 5/14; F01P 11/16; G06G 7/70
USPC .................................................. 701/102, 113
See application file for complete search history.

(56) References Cited

U.S. PATENT DOCUMENTS

| | | | | |
|---|---|---|---|---|
| 6,804,588 B2 * | 10/2004 | Oki | ........................ | F01P 11/14 123/350 |
| 7,932,833 B2 * | 4/2011 | Deivasigamani | ....... | F01P 11/18 123/22 |
| 8,370,052 B2 * | 2/2013 | Lin | ........................ | F01P 11/16 123/41.08 |
| 8,813,692 B2 * | 8/2014 | Bialas | ..................... | F01P 7/167 123/41.01 |
| 8,813,693 B2 * | 8/2014 | Bialas | ................. | F04D 15/0209 123/198 D |
| 8,915,127 B2 * | 12/2014 | Graf | ........................ | F01P 5/14 73/114.68 |
| 2004/0199324 A1 * | 10/2004 | Li | .......................... | F01P 11/14 701/114 |
| 2011/0098883 A1 | 4/2011 | Eser et al. | | |

FOREIGN PATENT DOCUMENTS

| | | |
|---|---|---|
| GB | 2475105 A | 5/2011 |
| WO | 2011039591 A1 | 4/2011 |

* cited by examiner

*Primary Examiner* — Hieu T Vo
*Assistant Examiner* — Arnold Castro
(74) *Attorney, Agent, or Firm* — Ingrassia Fisher & Lorenz PC (57) ABSTRACT

A method for performing on/off diagnosis of a smart cooling pump for an internal combustion engine comprising a cylinder having an inner liner layer, an external engine block layer, and a coolant layer placed between the inner liner layer and the external engine block layer, wherein the smart cooling pump pumps a coolant fluid inside the coolant layer is provided.

15 Claims, 5 Drawing Sheets

METHOD FOR PERFORMING ON/OFF DIAGNOSIS OF A SMART COOLING PUMP FOR AN INTERNAL COMBUSTION ENGINE

CROSS-REFERENCE TO RELATED APPLICATION

This application claims priority to British Patent Application No. 1108388.8, filed May 19, 2011, which is incorporated herein by reference in its entirety.

TECHNICAL FIELD

The technical field generally relates to a method for performing on/off diagnosis of a smart cooling pump for an internal combustion engine.

BACKGROUND

The smart cooling pump has been introduced in the cooling system of an internal combustion engine, which comprises at least one cylinder provided with an inner liner layer, an external engine block layer, and a coolant layer placed between the inner liner layer and the external engine block layer. The smart cooling pump guarantees good thermal conditions to the engine and avoids drag of the smart cooling pump if not required by the engine thermal status. This component is in fact able to reduce both $CO_2$ consumptions and pollutant emissions. In any case, the complexity and the criticality of the smart cooling pump require a method that is able to evaluate if the pump is actually working properly or not, that is to say, if the pump is actually switched on or off when the control system requires it. In fact, if the smart cooling pump is correctly diagnosed it is possible to take the correct recovery action in order to save the internal engine from damage in case the smart cooling pump is malfunctioning. It is also possible to finely control the coolant circuit system in order to save consumption and pollutant emissions when the smart cooling pump works correctly.

Several solutions have been proposed for performing on/off diagnosis of a smart cooling pump of an internal combustion engine based on the thermal behaviour of the internal combustion engine. Unfortunately, nowadays there is no valid signal to be monitored that could realistically take into account the effect of the thermal inertia and of the requested load of an internal combustion engine, thus making the proposed on-off diagnosis methods unreliable.

In particular, proposed solutions to evaluate the thermal inertia and the requested load of an internal combustion engine adopt a plurality of temperature sensors placed on each layer of the engine. Such temperature sensors measure the local temperature of each layer of the engine in order to evaluate the thermal behaviour of the engine in any working condition. In practice, at least one temperature sensor is placed on each layer of the engine so that it is possible to try to evaluate temperatures and heat flux variation during the functioning of the engine, that is to say, in a continuous way. Unfortunately, such a methodology does not consider in a precise way the thermal dynamic behaviour of the engine since the temperatures on each layer are measured only locally and it is rather difficult to estimate the average temperature on each layer of the engine. This results in a very unprecise estimate of the thermal behaviour of the internal combustion engine and, as a consequence, of the on/off diagnosis of the smart cooling pump.

Therefore, it is at least one object herein to provide a method for performing on/off diagnosis of a smart cooling pump, taking into account the engine thermal inertia and the requested load of the internal combustion engine, which is simple and reliable in predicting if the smart cooling pump is working correctly or not. In addition, other objects, desirable features and characteristics will become apparent from the subsequent summary and detailed description, and the appended claims, taken in conjunction with the accompanying drawings and this background.

SUMMARY

In accordance with an exemplary embodiment, a method for performing on/off diagnosis of a smart cooling pump for an internal combustion engine that includes a one cylinder provided with an inner liner layer, an external engine block layer, and a coolant layer placed between the inner liner layer and the external engine block layer, wherein the smart cooling pump pumps a coolant fluid inside the coolant layer, is provided. The method includes: a) measuring the current value of a plurality of time-varying engine parameters including a coolant layer temperature and the inner liner layer temperature, and measuring the current value of the ambient temperature; b) modelling the current value of the average temperature of the inner liner layer by solving for each of the engine layers an enthalpy balance equation, a heat exchange equation and by solving a combustion heat flow equation and a friction heat flow equation for the engine; c) performing on/off diagnosis of the smart cooling pump by evaluating if the difference between the modelled average temperature and the measured temperature of the inner liner layer is greater/smaller than a threshold value; d) comparing on/off status of the smart cooling pump diagnosed during step c) with on/off status of the smart cooling pump required by an electronic control unit for the internal combustion engine; and e) performing control strategy on the smart cooling pump and/or the internal combustion engine.

In other words, the method is intended to obtain on/off diagnosis of the smart cooling pump in a simple and reliable way by adopting a mixed measuring-modelling approach. Thus, once the current value of some measured time-varying parameters, that is to say, the current measured coolant layer temperature and the current measured ambient temperature, are inserted in the enthalpy balance equations and heat exchange equations the current value of the average temperature of the inner liner layer can be predicted in a very simply and efficient way. Such a solution allows to overcome the above mentioned problems, that is to say, of measuring the local temperatures of one or more engine layers that result in an unreliable way. Furthermore, the current value of the difference between the modelled average temperature and the measured temperature of the inner liner layer is compared with a pre-set threshold value. In case such a difference is greater than the threshold value, the smart cooling pump is on; otherwise the smart cooling pump is off.

Such an embodiment provides for a mathematical model of the thermal behaviour of an internal combustion engine. According to such a model the enthalpy balance equation and the heat exchange equation for each layer of the engine are provided in order to evaluate, starting from the ambient temperature and the coolant temperature, the heat fluxes through each layer and so the average temperatures on each layer.

The heat flux from combustion chamber to cylinder liner is known from injected fuel mass, or flow, and the engine thermal efficiency is known from the total thermal balance tests that are performed for each engine.

The heat transfer coefficient between engine block and environment is calculated as a function of the air flow conditions around the engine, that is to say, as a function of the vehicle speed, and of the air temperature measured in the airflow meter.

Therefore the proposed solution considers in a correct way the thermal inertia of each engine layer, starting from the inputs, the average temperature of the inner liner layer are calculated solving a system of seven equations, and is applicable in all the situations in which the thermostat is closed. The solution is tuned-up for each application by simply calibrating the engine characteristics.

Furthermore the plurality of measured time-varying engine parameters includes engine rotation speed and oil temperature.

According to an embodiment, before step b), the method comprises modelling the current value of a further plurality of time-varying engine parameters including at least engine friction torque, engine block/ambient heat transfer coefficient, and coolant/engine block heat transfer coefficient. In particular the engine block/ambient heat transfer coefficient is modelled as a function of the vehicle speed. The step of modelling the current value of a further plurality of time-varying engine parameters can be indifferently performed after or before step a).

In another embodiment, before step b), the method further includes a step of setting the current value of a plurality of constant engine parameters including at least liner mass, coolant mass, block engine mass, lubricating oil mass, coolant/engine block area, engine block/ambient area, liner specific heat capacity, coolant specific heat capacity, engine block specific heat capacity, and oil specific heat capacity. Such constant parameters do not depend on time and are intrinsic characteristics of the particular internal combustion engine chosen to be diagnosed. The step of setting the current value of a plurality of constant engine parameters can be performed after or before the step a).

After the step c), the method includes a step d) of comparing on/off status of the smart cooling pump, diagnosed during step c), with on/off status of the smart cooling pump required by an electronic control unit for the internal combustion engine. In practise, once the on/off status is diagnosed it is possible to verify if the smart cooling pump is correctly working by comparing the on/off diagnosed status with the on/off status requested by the electronic control unit. Furthermore, after the step d), the method includes a step e) of performing control strategy on the smart cooling pump and/or the internal combustion engine. Therefore, for instance, if the diagnosed status is on, while the requested status is off, that is to say, based on the comparison performed during the step d), it is possible to take the correct recovery action in order to save the internal engine from damage. On the contrary, if the diagnosed status is on and the requested status is on, it is possible to finely control the smart cooling pump in order to save consumption and pollutant emissions of the internal combustion engine.

In an embodiment, a computer program comprising computer executable codes for performing on/off diagnosis of a smart cooling pump for an internal combustion engine as above disclosed is provided. In particular, the computer program is stored on computer-readable medium or a suitable storage unit and comprises: a computer executable code for measuring the current value of the plurality of time-varying engine parameters including at least the coolant layer temperature and the inner liner layer temperature, and for measuring the current value of the ambient temperature; a computer executable code for modelling the current value of the average temperature of the inner liner layer by solving for each of the engine layers an enthalpy balance equation and a heat exchange equation and by solving a combustion heat flow equation and a friction heat flow equation for the engine; a computer executable code for performing on/off diagnosis of the smart cooling pump by evaluating if the difference between the modelled average temperature and the measured temperature of the inner liner layer is greater/smaller than a threshold value; a computer executable code for comparing diagnosed on/off status of a smart cooling pump with the on/off status of the smart cooling pump required by an electronic control unit for the internal combustion engine; and a computer executable code for performing control strategy on the smart cooling pump and/or the internal combustion engine.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Figure 1:
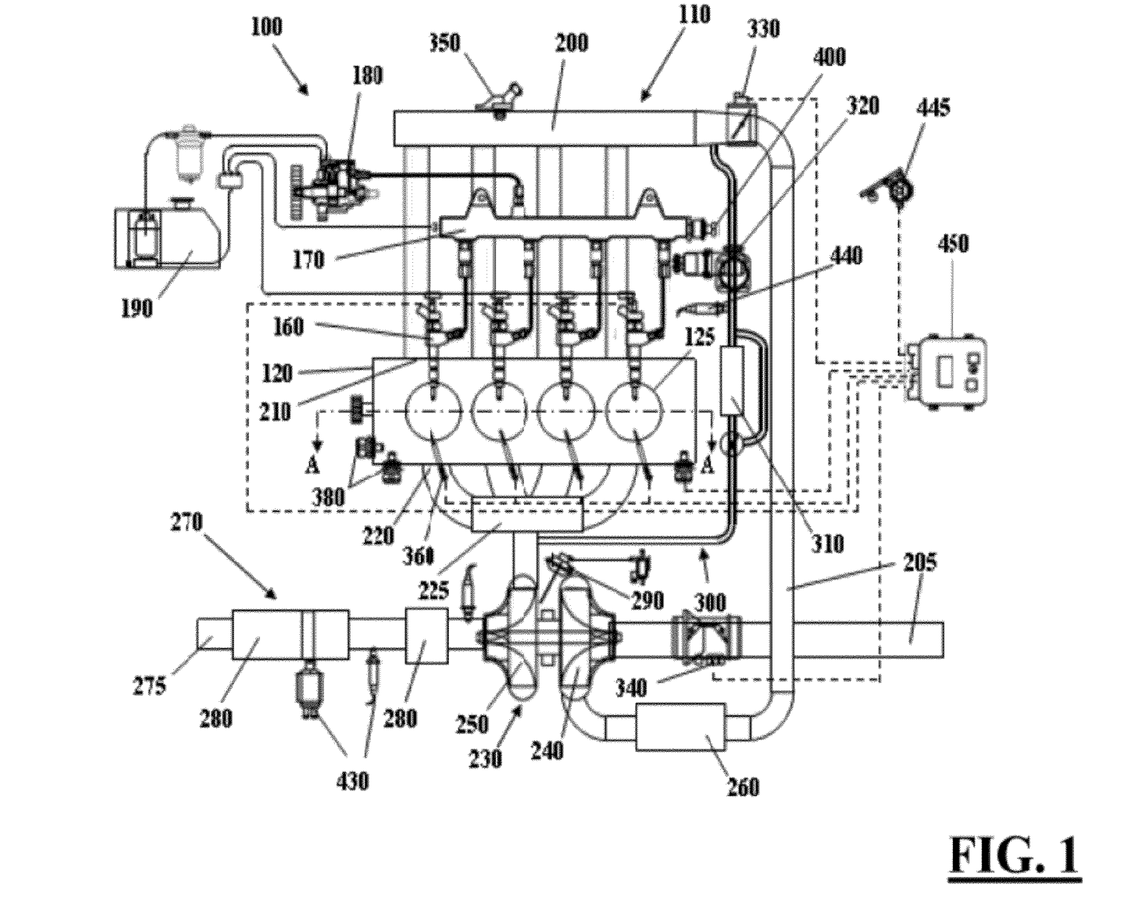
FIGS. 1 and 2 are schematic views of an automotive system according to embodiments.
Figure 2:
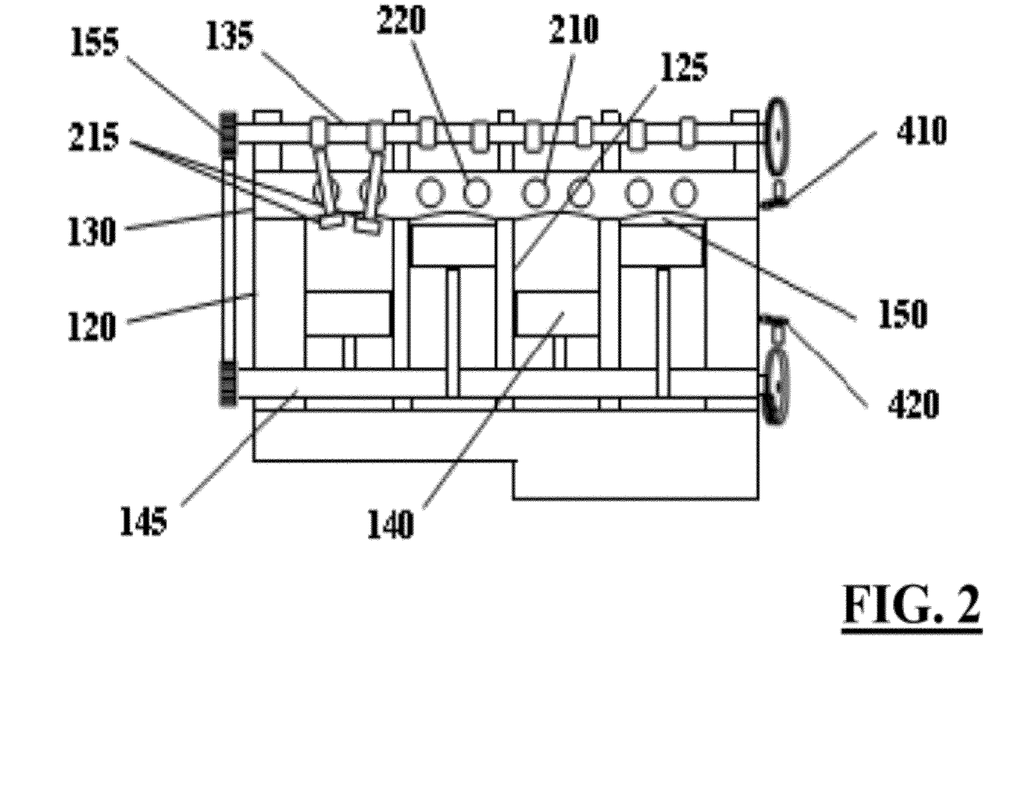

In an exemplary embodiment, as shown in FIGS. 1 and 2, an automotive system 100 includes an internal combustion engine (ICE) 110 having an engine block 120 defining one (or more) cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean NOx traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

In an embodiment, the automotive system 100 further includes an electronic control unit (ECU) 450 in electrical communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate electrical communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system, and send and receive signals to/from the interface bus. The memory system may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout the steps of such methods and control the ICE 110.

Figure 3:
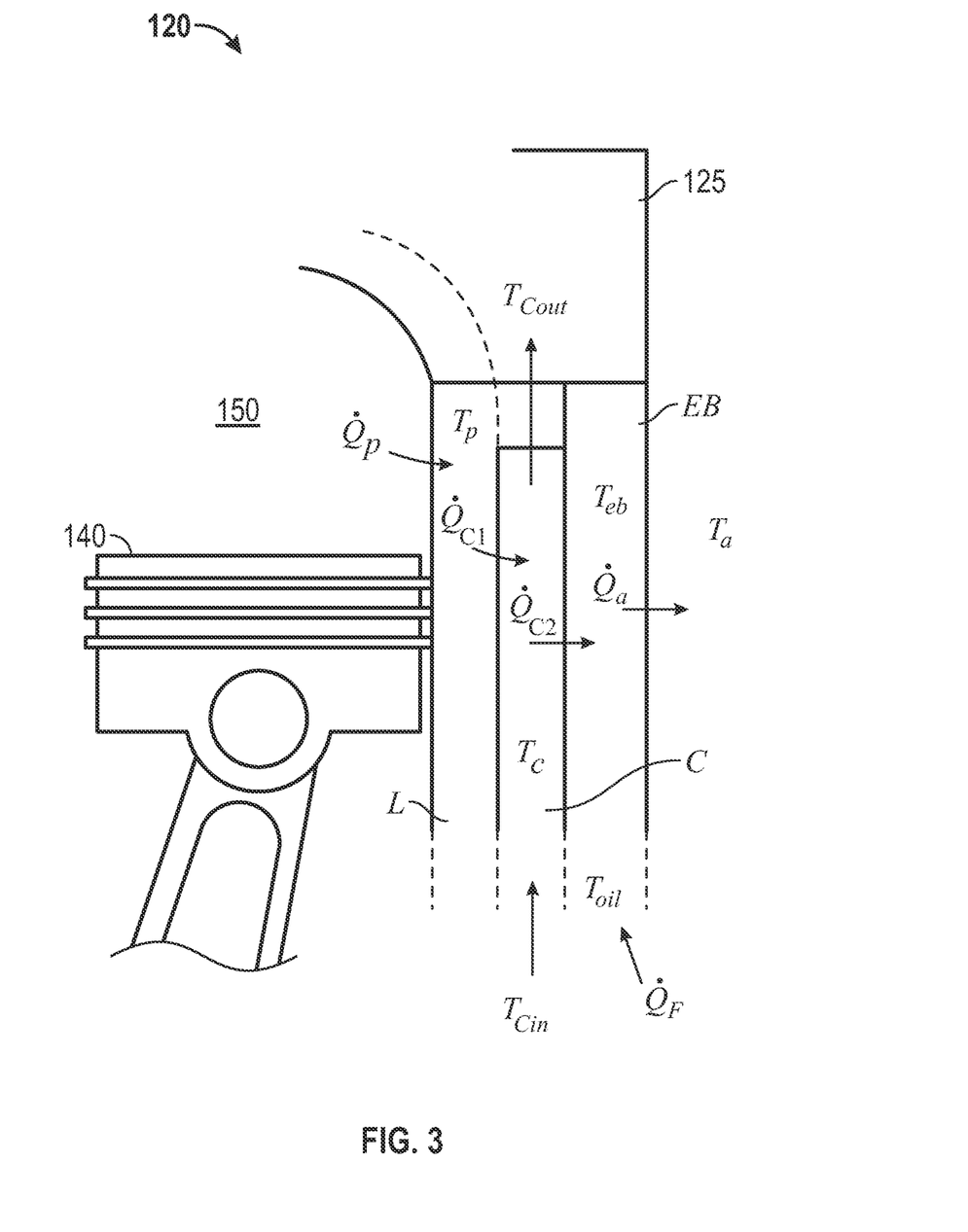
FIG. 3 is a schematic view of a portion of an internal combustion engine according to an embodiment.

In FIG. 3 it is shown a portion of the internal combustion engine (ICE) 110 above disclosed having an engine block 120 defining a cylinder 125 having a piston 140 coupled to rotate a crankshaft 145. Still, as above mentioned, the cylinder head 130 cooperates with the piston 140 to define a combustion chamber 150. The cylinder 125 is provided with an inner liner layer L, an external engine block layer EB and a coolant layer C placed between the inner liner layer L and the external engine block layer EB.

Figure 4:
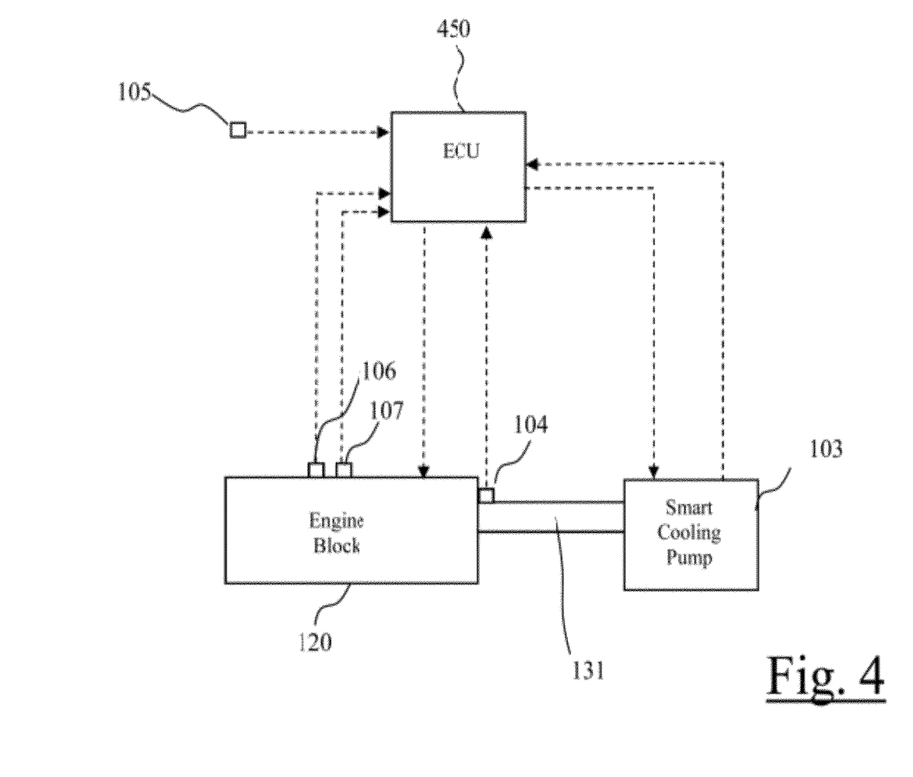
FIG. 4 is a block diagram of an electronic control apparatus for performing on/off diagnosis of a smart cooling pump for an internal combustion engine according to an embodiment.

Furthermore, FIG. 4 is a simplified block diagram of automotive system 100 including an ICE 110 and a smart cooling pump 103 for circulating a coolant fluid inside the coolant layer C. A plurality of suitable sensors are provided in order to measure the current value of a plurality of time-varying parameters. More in detail, a temperature sensor 380 is mounted on the coolant circuit 106 for measuring the temperature Tc of the coolant fluid and a temperature sensor 105 is mounted externally to the engine block 120 to measure the ambient temperature Ta, or intake air temperature. Furthermore, in order to provide a signal with the current measured value of the engine rotation speed n and oil temperature Toil, a rotation speed sensor 106 and a temperature sensor 107 are mounted on the engine block 120, while the current value of the mass fuel flow rate mF for the ICE is provided by the ECU 450. ECU 450 also switches on or off the smart cooling pump during the functioning of the ICE 110 thus controlling the requested on/off status of the smart cooling pump 103.

The method for performing on-off diagnosis of the smart cooling pump 103 is based on modelling the average temperature TavgL of the inner liner layer L, starting from the ambient temperature Ta, or intake air temperature, and the coolant layer temperature Tc. In FIG. 3 the parameters that refer to a particular layer having as a subscript the same reference adopted for that particular layer.

Figure 5:
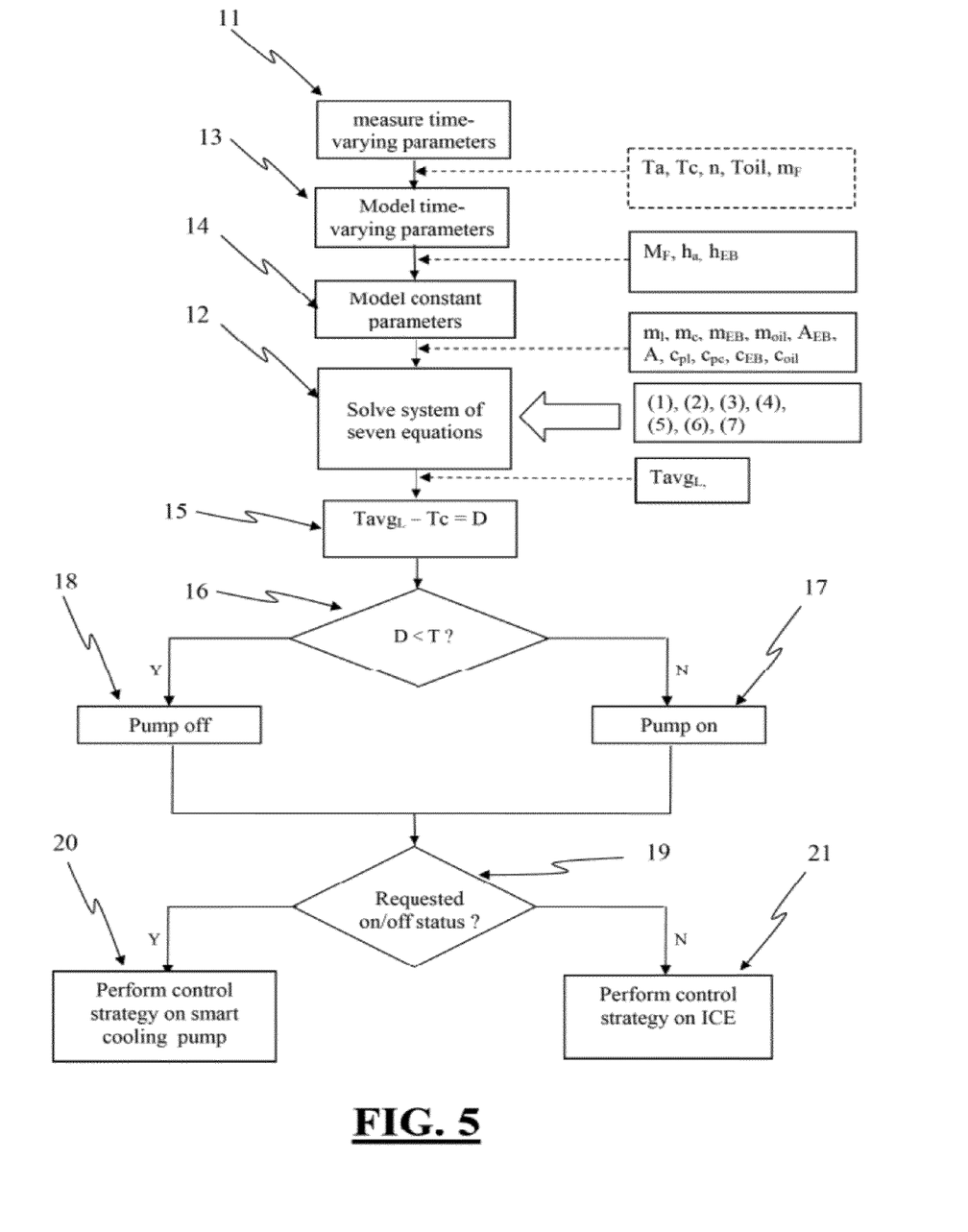
FIG. 5 is a flow chart of the complete logic overview of the method for performing on/off diagnosis of a smart cooling pump for an internal combustion engine according to an embodiment.

In FIG. 5 it is shown the complete logic overview of the method for performing on/off diagnosis of the smart cooling pump 103 for the ICE 110. In the left portion of FIG. 5 there are represented the steps during which the system conditions are determined, while on the right side of FIG. 5 the parameters controlled in each phase in order to establish the current operating system conditions are schematically indicated.

In general, block 11 shows the step a) of measuring the current value of a plurality of time-varying engine parameters including at least coolant layer temperature Tc and the inner liner layer temperature TL, and the current value of the ambient temperature Ta, while block 12 shows the step b) of modelling the current value of the average temperature TavgL of the inner liner layer L by solving for each of the engine layers L, A, EB at least the enthalpy balance equation 1, 2, 3 and the heat exchange equation 4, 5, and by solving the heat flow equation 6 and the friction heat flow equation 7 for the ICE 110.

More in detail, block 12 contains a set of equations applied to determine the current value of the average temperature $\text{Tavg}_L$ of the inner liner layer L, as follows:

inner liner enthalpy balance equation, $$\dot{Q}_l - \dot{Q}_{cl} = m_l c_{pl} \frac{dT_l}{dt} \quad (1)$$

$\dot{Q}_1$=heat flow from combustion chamber to liner (calculated multiplying the injected fuel mass for the percentage of the heat exchanged with liner, measured in total thermal balance tests)
$\dot{Q}_{cl}$=heat flow from liner to coolant
$m_1$=liner mass
$c_{pl}$=liner specific heat capacity
$T_1$=liner temperature
coolant enthalpy balance equation, $$\dot{Q}_{c1} - \dot{Q}_{c2} = \dot{m}_c c_{pc}(T_{c_{in}} - T_{c_{out}}) + m_c c_{pc}\frac{dT_{c_{out}}}{dt} \quad (2)$$

$\dot{Q}_{c2}$=heat flow from coolant to engine block $T_{c_{in}}$=input coolant temperature
$\dot{m}_c$=coolant flow rate $T_{c_{out}}$=output coolant temperature
$c_{pc}$=coolant specific heat capacity $m_c$=coolant mass
Assumption:

$$T_{c_{in}} = T_{c_{out}} \Longrightarrow \dot{Q}_{c1} - \dot{Q}_{c2} = m_c c_{pc}\frac{dT_{c_{out}}}{dt}$$

engine block enthalpy balance equation, $$\dot{Q}_{c2} + \dot{Q}_F - \dot{Q}_a = m_{EB}c_{pEB}\frac{dT_{EB}}{dt} + m_{oil}c_{poil}\frac{dT_{oil}}{dt} \quad (3)$$

$\dot{Q}_F$=heat flow due to friction $T_{EB}$=engine block temperature
$\dot{Q}_a$=heat flow from engine block to ambient $m_{oil}$=oil mass
$m_{EB}$=engine block mass $c_{poil}$=oil specific heat capacity
$c_{pER}$=engine block specific heat capacity $T_{oil}$=oil temperature
coolant/engine block heat exchange equation, $$\dot{Q}_a = h_a A(T_{EB} - T_a) \quad (4)$$

$h_a$=heat transfer coefficient between engine block and environment
A=area of the engine block facing environment
$T_a$=environment temperature
engine block/ambient heat exchange equation, $$\dot{Q}_{c2} = h_{EB}A_{EB}(T_{c_{out}} - T_{EB}) \quad (5)$$

$h_{EB}$=heat transfer coefficient between coolant and engine block
$A_{EB}$=area of the engine block facing coolant
combustion heat flow equation for the engine, $$\dot{Q}_F = M_F \frac{n}{60} \quad (6)$$

$M_F$=friction torque
n=engine speed
friction heat flow equation for the engine, $$\dot{Q}_i = \frac{\dot{m}_F \cdot H_i \cdot v \cdot n \cdot n_{cyl} \cdot \eta_t}{120} \quad (7)$$

$\dot{m}_F$=fuel flow rate
$H_i$=calorific value of fuel
v=fuel specific gravity
$n_{cyl}$=number of cylinder
$\eta_1$=engine thermal efficiency During the on/off diagnosis method, in particular during step a), engine rotation speed n and oil temperature Toil are measured by means of respective sensors, while mass fuel flow rate mF for the engine is known by the injected fuel mass.

Furthermore in block 13, before the step b) illustrated in block 12, it is shown a step of modelling the current value of a further plurality of time-varying engine parameters including at least engine friction torque MF, engine block/ambient heat transfer coefficient ha, and coolant/engine block heat transfer coefficient hEB. In particular the engine block/ambient heat transfer coefficient ha is modelled as a function of the vehicle speed; in fact at a vehicle speed inferior to 3 km/h the convection can be considered natural, while at a speed velocity superior to 3 Km/h the convection can be considered forced. It should be pointed out that such a vehicle speed can be chosen in an interval between 0 and 10 Km/h.

In another embodiment, before step b) illustrated in block 12, the method includes a step of setting the current value of a plurality of constant engine parameters. The step is illustrated in block 14. Such a plurality of constant parameters includes liner mass ml, coolant mass mc, block engine mass mEB, lubricating oil mass moil, coolant/engine block area AEB, engine block/ambient area A, liner specific heat capacity cpl, coolant specific heat capacity cpc, engine block specific heat capacity cEB, oil specific heat capacity coil. Therefore the constant parameters define intrinsic characteristics of the internal combustion engine to be monitored and do not vary during the whole on/off diagnosis process.

Again, blocks 15 and 16 show the step c) of performing on/off diagnosis of the smart cooling pump 103 by evaluating if the difference D between the modelled average temperature TavgL and the measured temperature TL of the inner liner layer L is greater/smaller than a threshold value T.

In particular, in the case when the calculated difference D is greater than a pre-set threshold value T, the smart cooling pump 103 is considered on, as shown in block 17, while in the case when the calculated difference D is smaller than the threshold value T, the smart cooling pump 103 is considered off, as shown in block 18. Therefore, it is possible to verify in a simple and reliable way if the smart cooling pump 103 is working correctly or not, simply by comparing the difference D between a modelled temperature, that is the average temperature TavgL of the inner liner layer L, and a measure temperature value, that is to say, the temperature TL of the inner liner layer L, with a threshold value T.

Furthermore, block 18 shows the step d) of comparing on/off status of the smart cooling pump 103, diagnosed during step c), with on/off status of the smart cooling pump 103, required by an electronic control unit 450 for the internal combustion engine 110. In fact, once the on/off status of the smart cooling pump 103 is diagnosed it is possible to verify if the smart cooling pump 103 is correctly working by comparing the on/off diagnosed status with the on/off status requested by the electronic control unit 450.

Finally, blocks 19 and 20 show the step e) of performing control strategy on the smart cooling pump 103 and/or the internal combustion engine 110 based on the comparison performed during step d).

Therefore, for instance, if the diagnosed status of the smart cooling pump 103 is on, while the requested status by the ECU is off, it is possible to take the correct recovery action in order to save the internal combustion engine 110 from damage, as shown in block 19. On the contrary, if the diagnosed status and the requested status of the smart cooling pump 103 are both on, it is possible to finely control the smart cooling pump 103 in order to save consumption and pollutant emissions of the internal combustion engine 110, as shown in block 20. Of course, the same control strategy on the smart cooling pump 103 and/or the internal combustion engine 110 also applies in case the diagnosed status of the smart cooling pump 103 is off, while the requested status is on, or in case the diagnosed status of the smart cooling pump 103 is off and the requested status is off. In the abovementioned first case it is possible to take the correct recovery action in order to save the internal combustion engine 110 from damage; in the second case it is possible to finely control the smart cooling pump 103 in order to save consumption and pollutant emissions of the internal combustion engine 110.

The method for performing on/off diagnosis of the smart cooling pump 103 for the internal combustion engine 110 may be carried out by means of a computer program comprising program codes (computer executable codes) for performing the controlling steps already described above in connection to FIG. 5. The computer program comprises computer executable codes for performing on/off diagnosis of the smart cooling pump 103 for an internal combustion engine 110 comprising a cylinder 125 provided with an inner liner layer L, an external engine block layer EB, and a coolant layer C placed between the inner liner layer L and the external engine block layer EB, wherein the smart cooling pump 103 pumps coolant fluid inside the coolant layer C.

The computer program comprises: a computer executable code for measuring the current value of the plurality of measured time-varying engine parameters including coolant layer temperature Tc and the current value of the ambient temperature Ta; a computer executable code for modelling the current value of the average temperature TL of the inner liner layer L by solving for each of the engine layers L,C, EB at least the enthalpy balance equation 1, 2, 3 and the heat exchange equation 4, 5 and by solving the combustion heat flow equation 6 and the friction heat flow equation 7 for the ICE 110; a computer executable code for modelling the current value of the further plurality of time-varying engine parameters; a computer executable code for performing on/off diagnosis of the smart cooling pump 103 by evaluating if the difference D between the modelled average temperature TavgL and the measured temperature TL of the inner liner layer L is greater/smaller than a threshold value T; a computer executable code for comparing diagnosed on/off status of the smart cooling pump 103 with on/off status of the smart cooling pump 103 required by an electronic control unit 450 for the internal combustion engine 110; and a computer executable code for performing control strategy on the smart cooling pump and/or the internal combustion engine.

According to an embodiment, the computer program is stored on a storage unit or a computer readable medium such as CD, DVD, flash memory, hard-disk, or the like, which is connected, or integrally produced with an electronic control apparatus for an internal combustion engine 110. The computer program can be also embodied as an electromagnetic signal, the signal being modulated to carry a sequence of data bits which represent a computer program to carry out all steps of the methods.

The electronic control apparatus is provided with a microprocessor, or any suitable means known in art, for receiving the computer codes of the computer program and for executing them. The electronic control apparatus can be made as a dedicated piece of hardware, known in the art, such as an electronic control unit (ECU) 450, shown in FIGS. 1 and 4. Electronic control unit 450 has an internal storage unit on which is stored the computer program for performing the on/off diagnosis of the smart cooling pump by using the current value of the plurality of time-varying parameters received from the sensors.

As already explained, the microprocessor of the ECU 450 receives and executes the computer program codes in order to perform on/off diagnosis of the smart cooling pump 103 for the circulation of a coolant fluid inside the coolant layer C and/or performing control strategy on the smart cooling pump 103 and/or the internal combustion engine 110.

It should be noted that the above mentioned constant parameters that represent chemical-physical-geometrical characteristics of the particular engine to be diagnosed and are unique for each engine are stored in a suitable storage unit, or on a computer readable medium, and preferably the computer program according to an embodiment and the values of the constant parameters are stored on the same storage unit or computer readable medium.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A method for performing on/off diagnosis of a smart cooling pump for an internal combustion engine comprising a cylinder having an inner liner layer, an external engine block layer, and a coolant layer placed between the inner liner layer and the external engine block layer, wherein the smart cooling pump pumps a coolant fluid inside the coolant layer, the method comprising the steps of:

measuring a current value of a plurality of time-varying engine parameters including a coolant layer temperature and an inner liner layer temperature to obtain a measured current value of the inner liner layer, and measuring a current value of an ambient temperature;

modelling a current value of an average temperature of the inner liner layer by solving for the external engine block layer, the coolant layer, and the inner liner layer an enthalpy balance equation and a heat exchange equation and by solving a combustion heat flow equation and a friction heat flow equation for the internal combustion engine to obtain a modelled current value of the average temperature of the inner liner layer;

determining an on/off status of the smart cooling pump by evaluating if a difference between the modelled current value of the average temperature of the inner liner layer and the measured current value of the inner liner layer temperature is greater or smaller than a threshold value;

comparing the on/off status of the smart cooling pump diagnosed during the determining with the on/off status of the smart cooling pump required by an electronic control unit for the internal combustion engine to obtain a status comparison; and performing a control strategy on the smart cooling pump and/or the internal combustion engine on a basis of the status comparison.

2. The method according to claim 1, wherein measuring the current value of the plurality of time-varying engine parameters further includes measuring a current value of an engine rotation speed and an oil temperature.

3. The method according to claim 2, wherein, before modelling, the method comprises setting a value of a plurality of constant engine parameters chosen from a liner mass, a coolant mass, a block engine mass, a lubricating oil mass, a coolant/engine block area, an engine block/ambient area, a liner specific heat capacity, a coolant specific heat capacity, an engine block specific heat capacity, and an oil specific heat capacity.

4. The method according to claim 2, wherein, before modelling, the method comprises modelling a current value of a further plurality of time-varying engine parameters including an engine friction torque, an engine block/ambient heat transfer coefficient and a coolant/engine block heat transfer coefficient.

5. The method according to claim 4, further comprising modelling the engine block/ambient heat transfer coefficient as a function of a vehicle speed.

6. A computer readable medium embodying a computer program product, the computer program product comprising:
a program for performing on/off diagnosis of a smart cooling pump for an internal combustion engine comprising a cylinder with an inner liner layer, an external engine block layer, and a coolant layer interposed between the inner liner layer and the external engine block layer, wherein the smart cooling pump pumps a coolant fluid inside the coolant layer, the program configured for:
measuring a current value of a plurality of time-varying engine parameters including a coolant layer temperature and an inner liner layer temperature, and measuring a current value of an ambient temperature;
modelling a current value of an average temperature of the inner liner layer by solving for the external engine block layer, the coolant layer, and the inner liner layer an enthalpy balance equation and a heat exchange equation and by solving a combustion heat flow equation and a friction heat flow equation for the internal combustion engine;
determining an on/off status of the smart cooling pump by evaluating if a difference between the current value of the average temperature and the current value of the inner liner layer temperature is greater or smaller than a threshold value;
comparing the on/off status of the smart cooling pump diagnosed during the determining with the on/off status of the smart cooling pump required by an electronic control unit for the internal combustion engine to obtain a status comparison; and
performing a control strategy on the smart cooling pump and/or the internal combustion engine on a basis of the status comparison.

7. The computer readable medium according to claim 6, wherein measuring the current value of the plurality of time-varying engine parameters further includes measuring a current value of an engine rotation speed and an oil temperature.

8. The computer readable medium according to claim 7, wherein, before modelling, the program is configured for setting a value of a plurality of constant engine parameters chosen from a liner mass, a coolant mass, a block engine mass, a lubricating oil mass, a coolant/engine block area, an engine block/ambient area, a liner specific heat capacity, a coolant specific heat capacity, an engine block specific heat capacity, and an oil specific heat capacity.

9. The computer readable medium according to claim 7, wherein, before modelling, the program is configured for modelling a current value of a further plurality of time-varying engine parameters including an engine friction torque, an engine block/ambient heat transfer coefficient and a coolant/engine block heat transfer coefficient.

10. The computer readable medium according to claim 9, wherein the program is further configured for modelling the engine block/ambient heat transfer coefficient as a function of a vehicle speed.

11. An electronic control apparatus for an internal combustion engine comprising:
a microprocessor; and
a storage memory in electronic communication with the microprocessor, wherein the storage memory stores a computer program for performing on/off diagnosis of a smart cooling pump for the internal combustion engine having cylinder with an inner liner layer, an external engine block layer, and a coolant layer placed between the inner liner layer and the external engine block layer, wherein the smart cooling pump pumps a coolant fluid inside the coolant layer;
wherein the microprocessor is able to receive and to execute computer executable codes of the computer program, the computer program configured to:
measuring a current value of a plurality of time-varying engine parameters including a coolant layer temperature and an inner liner layer temperature, and measuring a current value of an ambient temperature;
modelling a current value of an average temperature of the inner liner layer by solving for the external engine block layer, the coolant layer, and the inner liner layer an enthalpy balance equation and a heat exchange equation and by solving a combustion heat flow equation and a friction heat flow equation for the internal combustion engine;
determining an on/off status of the smart cooling pump by evaluating if a difference between the current value of the average temperature and the current value of the inner liner layer temperature is greater or smaller than a threshold value;
comparing the on/off status of the smart cooling pump diagnosed during the determining with the on/off status of the smart cooling pump required by an electronic control unit for the internal combustion engine to obtain a status comparison; and
performing a control strategy on the smart cooling pump and/or the internal combustion engine on a basis of the status comparison.

12. The electronic control apparatus according to claim 11, wherein measuring the current value of the plurality of time-varying engine parameters further includes measuring a current value of an engine rotation speed and an oil temperature.

13. The electronic control apparatus according to claim 12, wherein, before modelling, the computer program is configured for setting a value of a plurality of constant engine parameters chosen from a liner mass, a coolant mass, a block engine mass, a lubricating oil mass, a coolant/engine block area, an engine block/ambient area, a liner specific heat capacity, a coolant specific heat capacity, an engine block specific heat capacity, and an oil specific heat capacity.

14. The electronic control apparatus according to claim 12, wherein, before modelling, the computer program is configured for modelling a current value of a further plurality of time-varying engine parameters including an engine friction torque, an engine block/ambient heat transfer coefficient and a coolant/engine block heat transfer coefficient.

15. The electronic control apparatus according to claim 14, wherein the computer program is further configured for modelling the engine block/ambient heat transfer coefficient as a function of a vehicle speed.

* * * * *